(12) United States Patent
Roeske

(10) Patent No.: US 7,654,165 B2
(45) Date of Patent: Feb. 2, 2010

(54) COMPOSITE STEERING RACK

(75) Inventor: Klaus Juergen Roeske, New South Wales (AU)

(73) Assignee: Bishop Innovation Limited, Rosehill, New South Wales (AU)

( * ) Notice: Subject to any disclaimer, the term of this patent is extended or adjusted under 35 U.S.C. 154(b) by 315 days.

(21) Appl. No.: 10/571,895

(22) PCT Filed: Sep. 22, 2004

(86) PCT No.: PCT/AU2004/001287

§ 371 (c)(1),
(2), (4) Date: Jan. 12, 2007

(87) PCT Pub. No.: WO2005/028141

PCT Pub. Date: Mar. 31, 2005

(65) Prior Publication Data

US 2007/0137343 A1   Jun. 21, 2007

(30) Foreign Application Priority Data

Sep. 23, 2003   (AU) .............................. 2003905204

(51) Int. Cl.
*F16H 35/00* (2006.01)

(52) U.S. Cl. .................. 74/388 PS; 74/422; 74/120; 29/893.34

(58) Field of Classification Search .................. 74/422, 74/89.11, 120, 388 PS; 29/893.34
See application file for complete search history.

(56) References Cited

U.S. PATENT DOCUMENTS

| | | | |
|---|---|---|---|
| 4,571,982 A | 2/1986 | Bishop et al. | |
| 4,573,399 A | 3/1986 | Wilson | |
| 4,598,451 A | 7/1986 | Ohki | |
| 5,241,848 A * | 9/1993 | Simon | 72/260 |
| 5,862,701 A | 1/1999 | Bishop et al. | |
| 6,317,979 B1 * | 11/2001 | Yamawaki | 29/893.34 |
| 6,442,992 B2 * | 9/2002 | Tsubouchi et al. | 72/370.21 |
| 6,453,981 B1 * | 9/2002 | Nomura et al. | 164/369 |
| 6,502,473 B1 * | 1/2003 | Akiyama et al. | 74/89.17 |
| 7,168,284 B2 * | 1/2007 | Shiokawa | 72/370.06 |
| 7,225,541 B2 * | 6/2007 | Kubota | 29/897.2 |
| 2001/0020328 A1 * | 9/2001 | Tsubouchi et al. | 29/893.34 |
| 2002/0020237 A1 * | 2/2002 | Tsubouchi et al. | 74/422 |
| 2002/0026845 A1 * | 3/2002 | Tsubouchi et al. | 74/457 |
| 2002/0073793 A1 * | 6/2002 | Tsubouchi et al. | 74/422 |
| 2003/0209100 A1 * | 11/2003 | Tsubouchi et al. | 74/422 |
| 2003/0213321 A1 * | 11/2003 | Tsubouchi et al. | 74/422 |
| 2004/0170401 A1 * | 9/2004 | Tsubouchi et al. | 386/125 |

(Continued)

FOREIGN PATENT DOCUMENTS

DE   42 35 635 A1   4/1994

(Continued)

*Primary Examiner*—David M Fenstermacher
(74) *Attorney, Agent, or Firm*—Birch, Stewart, Kolasch & Birch, LLP

(57) ABSTRACT

A steering rack for a vehicle rack and pinion steering gear and a method of manufacturing a steering rack includes a first member having a toothed region, attached to a tubular second member, the second member includes a bore, the cross section of the bore being circular along the length of the second member. The second member has at least one region of increased wall thickness and reduced bore diameter formed by an upsetting operation.

6 Claims, 2 Drawing Sheets

U.S. PATENT DOCUMENTS

2004/0177501 A1* 9/2004 Saarinen ..................... 29/875
2005/0072002 A1* 4/2005 Kubota .................... 29/893.34
2005/0255927 A1* 11/2005 Michioka et al. ............ 464/181
2008/0229856 A1* 9/2008 Yamawaki et al. ............ 74/422

FOREIGN PATENT DOCUMENTS

| | | | |
|---|---|---|---|
| EP | 0 099 311 | A1 | 1/1984 |
| EP | 1 316 492 | A1 | 6/2003 |
| FR | 2 513 203 | A1 | 3/1983 |
| JP | 9-132151 | A | 5/1997 |
| WO | WO-02/076653 | A1 | 10/2002 |

* cited by examiner

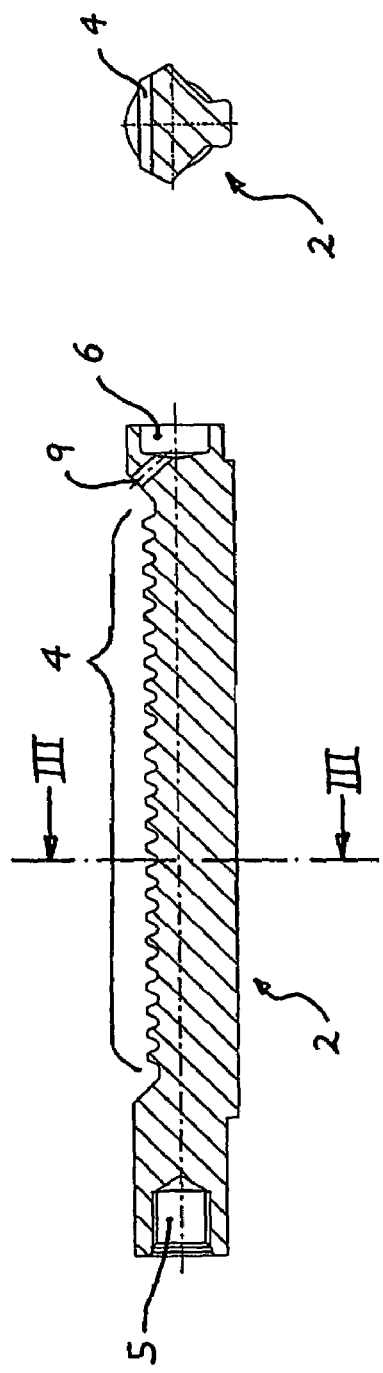
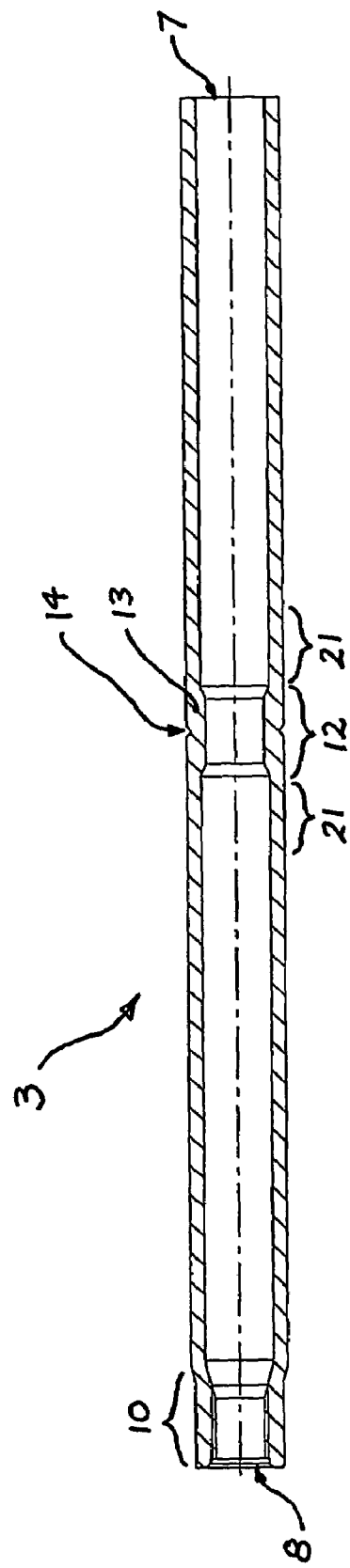

COMPOSITE STEERING RACK

TECHNICAL FIELD

The present invention relates to steering racks for vehicle rack and pinion steering gears, and more particularly to such racks manufactured by attaching a tubular member to a toothed member.

BACKGROUND

Most vehicle steering racks are manufactured from round solid bar stock, with the toothed region broached across the bar near one end. This results in the cross section of the toothed region having a 'D' shape and hence these racks are commonly referred to as "D-racks". The toothed region of such a broached D-rack has significantly less bending strength than the round solid shank extending from it. However, to minimize the weight of the steering rack, it is desirable that the toothed region and the shank have similar bending strength. A common approach to this problem is to gun drill the shank over most of its length resulting in a substantially tubular shank. However, the disadvantages of gun drilling are that material is wasted and it is a relatively expensive process.

An alternative method of manufacturing a steering rack from round solid bar stock is to forge the toothed region. U.S. Pat. No. 4,571,982 (Bishop) and U.S. Pat. No. 5,862,701 (Bishop et al) disclose die apparatus for flashless warm forging the toothed region to net shape. "Net shape" means that the forged rack teeth do not require any further machining after forging. An advantage of forging is that the rack teeth may be shaped to have a variable gear ratio. The cross section of the toothed region of racks forged by this type of die has a 'Y' shape and such racks are commonly referred to as "Y-racks". The toothed region of a forged Y-rack has greater bending strength than the toothed region of a D-rack broached from the same diameter solid bar, and so Y-racks can be forged from smaller diameter bar whilst maintaining overall bending strength. However, the shanks of Y-racks are still commonly gun drilled to further reduce weight.

Numerous attempts have been made to further reduce weight by the manufacture of hollow steering racks from tube stock. One such method used in limited production is disclosed in U.S. Pat. No. 4,598,451 (Takanosuke) where a series of mandrels is passed through a flattened tube to progressively fill an external tooth die. This method is expensive and time consuming and as such is not suited to high volume production. Furthermore, the size of teeth that can be produced is limited by the wall thickness of the tube and the method is not suited to producing racks with variable ratio teeth.

A "composite rack" is defined as a rack made by joining two or more members to each other. Typically a composite rack is made by joining a shank made from tube to a short solid rack member. Such composite racks have the advantages of reduced weight without the limitations of forming the rack teeth onto a tube. Various methods of making composite racks have been proposed or used in limited production. For example, a composite steering rack has been used in Honda "Odyssey" vehicles. This rack is made by welding a tubular shank to a short solid forged D-rack. Typically, steering racks for hydraulic power steering gears have an external circumferential groove approximately mid way along the shank for locating a hydraulic piston. A disadvantage of the Honda "Odyssey" rack is that since the tubular shank has a constant wall thickness along its length, the wall must be thick enough to machine this groove on its outside diameter without weakening the rack. The wall of the tube must also be thick enough to machine an internal thread at one end to attach a tie rod end. These localized limitations on wall thickness mean that a composite rack having a tubular shank of constant wall thickness cannot fully exploit the weight saving potential of a composite rack.

The present invention seeks to ameliorate at least some of the disadvantages of the prior art.

SUMMARY OF INVENTION

In a first aspect of the present invention consists of a steering rack for a vehicle rack and pinion steering gear, comprising a first member having a toothed region, attached to a tubular second member, said second member having a bore, the cross section of said bore being circular along the length of said second member, characterized in that said second member has at least one region of increased wall thickness and reduced bore diameter formed by an upsetting operation.

Preferably, said region of increased wall thickness and the portions of said second member immediately adjacent thereto have substantially the same outside diameter.

Preferably, said region of increased wall thickness has an external circumferential groove.

Preferably, said upsetting operation is performed prior to attaching said first and second members to each other.

Preferably, said first and second members are attached to each other by a welding operation.

Preferably, said first member is substantially solid.

Preferably, said toothed region is flashless warm forged.

In a second aspect the present invention consists of a method of manufacturing a steering rack for a vehicle rack and pinion steering gear comprising the steps of (i) forging a blank to form a first member having a toothed region; and (ii) attaching said first member to a tubular second member by a welding operation, said second member having a bore, the cross section of said bore being circular along the length of said second member;

characterized in that said second member is manufactured by performing an upsetting operation on a tube such that said second member has at least one region of increased wall thickness and reduced bore diameter.

Preferably, said upsetting operation does not substantially alter the outside diameter of said tube.

Preferably, subsequent to said upsetting operation, a circumferential groove is machined in the outside diameter of said region of increased wall thickness.

Preferably, said forging comprises flashless warm forging.

Preferably, prior to step (ii), the ends of said first member are finished machined.

Preferably, prior to step (ii), said toothed region is induction hardened.

BRIEF DESCRIPTION OF DRAWINGS

FIG. 2 is a cross sectional view of the forged rack tooth member of the rack shown in FIG. 1.

FIG. 3 is a cross section through m-m of the forged rack tooth member shown in FIG. 2.

FIG. 4 is a cross sectional view of the tubular shank member of the rack shown in FIG. 1.

BEST MODE OF CARRYING OUT THE INVENTION

Figure 1:
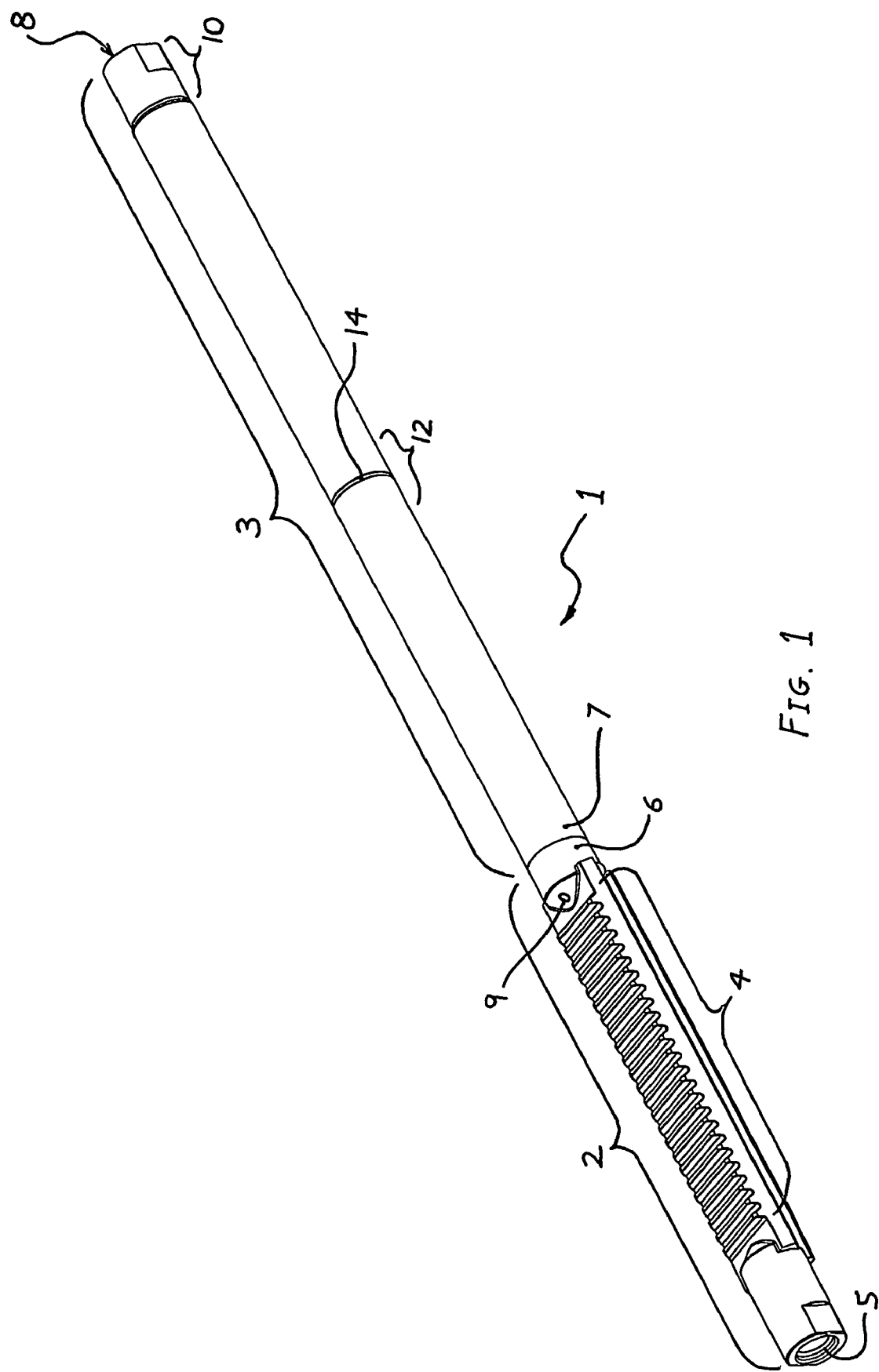
FIG. 1 is a perspective view of a composite steering rack in accordance with the present invention.

FIG. 1 depicts a composite steering rack 1 in accordance with the present invention comprising a forged rack tooth member 2 and a tubular shank member 3. Tooth member 2 has a toothed region 4 over a substantial length thereof, a tie rod end 5 with an internal thread for attaching a tie rod, and a joint end 6 at the opposite end thereof.

Tooth member 2 is flashless warm forged from a solid cylindrical blank (not shown) in a die apparatus similar to that disclosed in U.S. Pat. No. 4,571,982 (Bishop) and U.S. Pat. No. 5,862,701 (Bishop et al). Toothed region 4 is forged to net shape and the teeth thereon do not require any further machining. The cross section of toothed region 4 has a 'Y' shape as shown in FIG. 3. Once tooth member 2 has been warm forged, toothed region 4 is subsequently induction hardened. The ends of tooth member 2 are left soft to allow for machining to produce tie rod end 5 and joint end 6, as shown in FIG. 2. Joint end 6 is machined to have a protruding annular form similar in outside and inside diameters to the joint end 7 of tubular shank member 3. An air bleed port 9 is drilled through end 6 to provide a vent passage for air to pass through the bore of tubular shank member 3.

Tubular shank member 3 is manufactured from a length of tube (not shown) of constant diameter and wall thickness. Referring to FIG. 4, tubular shank member 3 has the same constant wall thickness and outside diameter as the tube along its length except for regions 10 and 12, which have increased wall thickness and reduced bore diameter formed by localized upsetting operations. Thickened region 12, has increased wall thickness 13 and a circumferential groove 14 machined on its outside diameter to locate a hydraulic piston (not shown). The outside diameter of thickened region 12 is substantially unaltered by the upsetting operation and as such the outside diameter of thickened region 12 is substantially the same as the portions 21 of tubular shank member 3 immediately adjacent thereto. Since circumferential groove 14 is in a region of increased wall thickness it does not weaken tubular shank member 3.

Thickened region 10 is at one end of tubular shank member 3 and has an internal thread 8 machined therein for attaching a tie rod end. Unlike thickened region 12, the outside diameter of thickened region 10 is reduced by the upsetting operation.

The localized thickening provided by the upsetting operations clearly allows tubular shank member 3 to be manufactured from a thinner wall tube than would otherwise be required if tubular shank member was of constant wall thickness. For example, a rack having a shank outside diameter of approximately 26 mm may be made in accordance with the present invention by upsetting a tube having a wall thickness of approximately 4 mm. This tube may be upset to increase the wall thickness to, for example, approximately 5.5 mm in thickened region 12 to provide sufficient strength once groove 14 is machined. A shank made from tube without upsetting would require a wall thickness of at least 5.5 mm along its length to provide the same strength at the region of groove 14, and hence such as rack would be significantly heavier than one made in accordance with the present invention.

The upsetting operation may be performed by locally heating the tube and then axially compressing it whilst restraining the outside diameter of the tube by rollers or the like. By restraining the outside diameter, the tube is upset inwardly thereby increasing the wall thickness and reducing the bore diameter at regions 10 and 12.

Subsequent to tooth member 2 and tubular shank member 3 being manufactured as described above, they are attached to each other by a welding operation. Joint end 6 of tooth member 2 is welded to joint end 7 of tubular shank member 3, preferably by a magnetic arc, friction or laser welding process. Once welding has taken place, any external excess weld seam may be removed in a conventional manner. A stress relieving operation may then be carried out on the weld. The integrity of the weld may be checked by a crack detection operation. After welding, tubular shank member 3 may be induction hardened and ground to finished size.

To minimize bending and misalignment during the welding operation, the tooth member and tubular shank member are clamped in a fixture and the welding operation is fully automated. The welding may be controlled to an extent that subsequent straightening operations are not required.

Whilst the embodiment described above utilizes a 'Y' shaped tooth member, it should be understood that tooth members of other forms may be used, such as 'D' shaped tooth members. It should also be understood that the tooth member may be made by a machining operation, such as broaching, instead of forging. Furthermore, the teeth of the tooth member may have either a constant ratio or variable ratio form.

The invention claimed is:

1. A method of manufacturing a steering rack for a vehicle rack and pinion steering gear comprising the steps of
   (i) forging a blank to form a first member having a toothed region; and
   (ii) attaching said first member to a tubular second member by a welding operation, said second member having a bore, the cross section of said bore being circular along the length of said second member;
      wherein said second member is manufactured by performing an upsetting operation on a tube such that said second member has at least one region of increased wall thickness and reduced bore diameter.

2. A method of manufacturing a steering rack as claimed in claim 1 wherein said upsetting operation does not substantially alter the outside diameter of said tube.

3. A method of manufacturing a steering rack as claimed in claim 1 wherein subsequent to said upsetting operation, a circumferential groove is machined in the outside diameter of said region of increased wall thickness.

4. A method of manufacturing a steering rack as claimed in claim 1 wherein said forging comprises flashless warm forging.

5. A method of manufacturing a steering rack as claimed in claim 1 wherein prior to step (ii), the ends of said first member are finished machined.

6. A method of manufacturing a steering rack as claimed in claim 1 wherein prior to step (ii), said toothed region is induction hardened.

* * * * *